(12) United States Patent
Berger et al.

(10) Patent No.: US 10,708,141 B2
(45) Date of Patent: Jul. 7, 2020

(54) SYSTEMS AND METHODS FOR VIRTUAL SHELF MANAGEMENT OF DISAGGREGATED NETWORK ELEMENTS

(71) Applicant: Fujitsu Limited, Kanagawa OT (JP)

(72) Inventors: Daniel Berger, Allen, TX (US); David Terwilliger, Garland, TX (US); Niranjan Mahabaleshwar, Bengaluru (IN); Maitreya Mukhopadhyay, Allen, TX (US)

(73) Assignee: Fujitsu Limited, Kawasaki (JP)

( * ) Notice: Subject to any disclaimer, the term of this patent is extended or adjusted under 35 U.S.C. 154(b) by 35 days.

(21) Appl. No.: 16/110,675

(22) Filed: Aug. 23, 2018

(65) Prior Publication Data

US 2020/0067784 A1 Feb. 27, 2020

(51) Int. Cl.
*H04L 12/24* (2006.01)
(52) U.S. Cl.
CPC .......... *H04L 41/12* (2013.01); *H04L 41/0677* (2013.01)
(58) Field of Classification Search
CPC ..... H04L 41/12; H04L 41/0677; H04L 41/00; H04L 41/0695; H04L 41/0803; H04L 41/0806; H04L 41/0809
See application file for complete search history.

(56) References Cited

U.S. PATENT DOCUMENTS

| | | | | |
|---|---|---|---|---|
| 2004/0260841 A1* | 12/2004 | Mathew | ............... | H04L 41/0206 709/250 |
| 2005/0198523 A1* | 9/2005 | Shanbhag | ............. | H04L 49/356 726/22 |
| 2005/0204104 A1* | 9/2005 | Aoshima | ............. | G06F 11/1448 711/161 |
| 2007/0058619 A1* | 3/2007 | Gopal Gowda | ........ | H04L 45/12 370/386 |
| 2008/0028107 A1* | 1/2008 | Cherian | ................ | G06F 3/0607 710/9 |
| 2009/0157941 A1* | 6/2009 | Bolan | ................. | H04L 41/0886 711/6 |
| 2012/0311116 A1* | 12/2012 | Jalan | ....................... | H04L 67/34 709/222 |
| 2017/0052919 A1* | 2/2017 | Purcell | ................ | G06F 13/4022 |
| 2017/0310413 A1* | 10/2017 | Cai | ....................... | H04L 45/745 |

* cited by examiner

*Primary Examiner* — Hoang-Chuong Q Vu
(74) *Attorney, Agent, or Firm* — Baker Botts L.L.P.

(57) ABSTRACT

Disclosed is a method of commissioning a tributary blade in a disaggregated network system, including assigning a port ID to a port of an MCU, mapping to a port map a virtual slot ID to the port ID, receiving a registration request from a tributary blade, and assigning the virtual slot ID to the tributary blade. Disclosed is a method of determining whether a mis-cabling condition exists, including determining the whether a virtual slot ID is mapped to a port ID in a port map. Disclosed is a disaggregated network system including an MCU, a first and second tributary blade coupled to the MCU at a first and second port. The MCU is operable to assign a first and second virtual slot ID to the first and second tributary blades. The MCU is operable to map a first and second virtual slot ID to a first and second port ID.

17 Claims, 3 Drawing Sheets

SYSTEMS AND METHODS FOR VIRTUAL SHELF MANAGEMENT OF DISAGGREGATED NETWORK ELEMENTS

FIELD OF THE DISCLOSURE

The present disclosure relates to systems and methods for managing disaggregated network elements in telecommunications networks.

BACKGROUND

Telecommunications networks are used by providers (users) to transport telecommunications signals to subscribers and other destinations. Telecommunications networks include network elements (NEs) that are logical entities. The NEs include one or more physical devices or "blades." The NEs are connected to enable telecommunications between terminals. The blades can perform a variety of tasks, such as switching to pass telecommunications to another blade or NE. As another example, a blade can transport telecommunications to a destination such as a telecommunication subscriber's home or office. As a further example, a blade can switch individual light signals onto separate paths to separate destinations. As a further example, a blade can monitor the telecommunications traffic of other blades and assign tasks to the blades.

One type of NE is a physically aggregated NE. In a physically aggregated NE, blades are connected through a backplane of a chassis of the NE. The chassis has a number of physical slots that can each receive a blade. An aggregated NE allows a telecommunications provider (or user) to simply plug in a new blade when it is desired. For example, a user may wish to provide telecommunications to a new destination or additional telecommunications to the same destination. The user may wish to replace a damaged blade or a blade that is not working. To replace a faulty blade in a physically aggregated NE, the user may simply remove the faulty blade from its physical slot and insert a new blade in the slot. Because a slot may be provisioned for a certain task, the blade can quickly begin operation upon plug-in.

Although replacement of blades in physically aggregated NEs is quick and simple, physically aggregated NEs have drawbacks. Because the blades are connected to a physical chassis of the NE, the number and arrangement of blades are limited to the physical slots of the NE. A physically aggregated NE is also limited to the resources in the blades, allocating discrete tasks to each blade.

In a disaggregated NE, tasks can be separated, meaning that hardware in one blade and software in another blade can be used to execute tasks. A disaggregated NE therefore allows optimization for performing tasks by using the subsystems best suited to perform the task. A disaggregated NE is logically aggregated, and blades may be interconnected by cables instead of at a backplane. Another benefit of disaggregated NEs is that a system using disaggregated NEs is efficiently scalable, supporting a pay-as-you grow model. A user of a network architecture using disaggregated NEs can expand incrementally to handle increases in traffic. A physically aggregated NE may be limited in that a discrete amount or amounts of hardware must be added at any one time to expand the system, providing large telecommunication traffic capacity that may be expensive and initially unneeded. Network architectures with disaggregated NEs therefore can provide cost efficiency in scalability. Additionally, different blades can have different form factors and power requirements. But network architectures with disaggregated NEs may be disadvantageous in that new or replacement blades in disaggregated NEs are more difficult to install or commission. Because the blades are, for example, interconnected by cables it may be difficult to add a new blade. A user cannot simply slide a new blade into a chassis and continue operation. A blade may have unique configurations using particular software or certain hardware components. In prior systems, plugging a new blade into a disaggregated NE requires steps similar to deploying a new NE. For example, there may be no physical slots that are provisioned to have a blade operate immediately upon plug-in. The complexity of deploying a new NE may exceed the quick plug-and-play of a new blade in a physically aggregated NE. Additionally, the numerous cables in a NE may add complexity to determining whether a blade has been connected to the wrong cable or a wrong blade has been connected to a cable.

SUMMARY

In a disaggregated network element (NE), commissioning and replacement of blades can be labor-intensive and error-prone. Virtual shelf management systems and methods disclosed herein allow for plug and play commissioning of new blades in a disaggregated NE. The systems and methods make the operational aspect of blade commissioning easy, like in a chassis-based, physically aggregated system, while also maintaining the many benefits of a disaggregated system. The systems and methods also reduce and detect the problem of mis-cabling of blades in a disaggregated environment.

Methods and systems disclosed herein allow automatic virtual slot ID assignment to blades based on port number in a disaggregated NE. Such assignment allows the systems and methods to track and control the tasks and connections of the blades. As an example, a virtual slot ID assigned to a tributary blade depends on a port map controlled by a management and control unit blade (an MCU). The port map may be controlled additionally or alternatively by a user. The MCU maps virtual slot identifiers (virtual slot IDs) to port identifiers (port IDs) in the port map. A port map can also be user-provisioned such that the user, through the MCU or otherwise, maps the virtual slot IDs to the port IDs in the port map. The port IDs are values that correspond to physical ports on the MCU. The virtual slot IDs are values that correspond to tributary blades, certain tasks to be performed by tributary blades, or both. If the MCU looks up a port ID, it may find the corresponding virtual slot ID mapped to the port ID. When a tributary blade is communicatively coupled to a port, it may receive from the MCU a virtual slot ID assignment based on which port receives the tributary blade. The tributary blade will receive a virtual slot ID assignment of the virtual slot ID mapped to the port ID of the port to which the tributary blade is communicatively coupled. The tributary blade will store its virtual slot ID in a local memory on the tributary blade. When the tributary blade is plugged into another port, the MCU can look up the port ID based on the port the tributary blade is plugged into, determine the virtual slot ID mapped to that port ID, and determine if the virtual slot ID in the port map is the same as the one assigned to and stored in the memory of the tributary blade. Additionally, the MCU can assign the tributary blade a new virtual slot ID and therefore a new port or task. The MCU can also assign new tasks to blades by mapping to virtual slot IDs certain tasks and assigning virtual slot IDs to certain tributary blades. The MCU can change the task of each blade by changing the mapping of virtual slot IDs to port IDs in the port map and assigning virtual slot IDs to blades. Alternatively or additionally, the user may assign tasks separately or by use of the MCU. Accordingly, the methods and systems allow for zero-touch blade replacement as the port map can be altered by an MCU, the system, or by a user remotely or automatically. Additionally, such port map management avoids mis-cabling of blades in a disaggregated NE.

An exemplary method includes assigning a port ID to a port of an MCU. The method includes receiving a registration request from a tributary blade through the port to a virtual shelf management (VSM) server running on the MCU and determining whether the port ID is mapped. The method includes accepting the registration request. The method includes assigning with the VSM server a virtual slot ID to the tributary blade. The method includes mapping to a port map, with the VSM server, the virtual slot ID to the port ID. The mapping may be done automatically by the VSM server, or by the user (through the VSM server or otherwise).

To help detect mis-cabling, before registering a tributary blade, an exemplary method includes determining whether the tributary blade is pre-registered.

To prevent incorrect registration denials, an exemplary method includes iteratively adding to a request count and sending, from the tributary blade to the VSM server, an additional registration request until the VSM server accepts the additional registration request or the request count meets a set number. An additional registration request may have default values (provisioned by the user, VSM server, or a combination thereof).

An exemplary method includes determining if a mis-cabling condition exists. The method includes determining, with a VSM server, a virtual slot ID of a tributary blade and determining whether the virtual slot ID is mapped to the port ID in the port map. The method may include sending an alert of the mis-cabling condition, so that a user or a device may correct the mis-cabling.

To set up a tributary blade so that it is operational, an exemplary method includes sending to the tributary blade a default set of parameters. The default set of parameters may be provisioned by the user or the VSM server.

In some cases, a user may want to force a VSM server to assign a pre-registered tributary blade to a new port. An exemplary method includes instructing, with the VSM server, the pre-registered tributary blade to erase a virtual slot ID stored in a local memory of the tributary blade. The tributary blade may then erase the virtual slot ID stored in the local memory of the tributary blade. The method may include receiving, with the VSM server, an erasure instruction to erase the virtual slot ID from the tributary blade. The method may include restarting the tributary blade after the erasing the virtual slot ID stored in the tributary blade and sending from the tributary blade to the VSM server a second registration request.

An exemplary method includes storing a virtual slot ID in a local memory of a tributary blade, so that an MCU can identify the tributary blade. The virtual slot ID may also be stored in memory of the MCU or persistent system memory. The system may determine which virtual slot ID is assigned to which tributary blade based on, for example, the which port each tributary blade is coupled to. The method may include storing the port map in a persistent system memory.

An exemplary method allows a user to force commissioning of a tributary blade when the tributary blade has a virtual slot ID that does not match the port ID mapped to the virtual slot ID in the port map. Such a method is desired, for example, when a tributary blade has been pre-registered and the user wants to change the tributary blade's port. The method includes receiving, with the VSM server, a replacement instruction and erasing a portion of the port map that has mapped the virtual slot ID to the port ID.

An exemplary method allows a user to determine whether a mis-cabling condition exists in a disaggregated network system. The method includes mapping to a port map a virtual slot ID to a port ID with a VSM server and receiving a tributary blade at a port of an MCU. The mapping may be done by the VSM server, by the user, or a combination thereof. The method includes determining, with the VSM server, whether the virtual slot ID is assigned to the tributary blade. Determining whether the virtual slot ID is assigned to the tributary blade includes reading a local memory of the tributary blade. If the memory of the tributary contains the virtual slot ID or a pointer thereto, the tributary blade has been plugged into the correct port. If not, the tributary blade may have been plugged into the wrong port. The method may include sending an alert of the mis-cabling condition.

To avoid wrongfully determining that a mis-cabling condition exists, an exemplary method includes iteratively adding to a request count and sending from the tributary blade to the VSM server a registration request until the VSM server accepts the registration request or the request count meets a set number. The method may further comprise determining whether the tributary blade is of a blade type mapped to the port in the port map.

Disclosed herein are disaggregated network systems. An exemplary disaggregated network system allows for plug-and-play functionality while still having the benefits of a disaggregated network. The system includes an MCU comprising a first port and a second port. The system includes a first tributary blade releasably and communicatively coupled to the MCU at the first port. The system includes a second tributary blade releasably and communicatively coupled to the MCU at the second port. The MCU is operable to assign a first virtual slot ID to the first tributary blade, assign a second virtual slot ID the second tributary blade, map the first virtual slot ID to the first port, and map the second virtual slot ID to the second port.

An exemplary system includes a first tributary blade and a second tributary blade that are communicatively and releasably coupled to an MCU in a star configuration.

In an exemplary system, the MCU runs a VSM server. The first tributary blade runs a first VSM client operable to communicate with the VSM server. The second tributary blade runs a second VSM client operable to communicate with the VSM server. An exemplary system includes a persistent system memory storing a port map.

BRIEF DESCRIPTION OF THE DRAWINGS

For a more complete understanding of the present disclosure and its features and advantages, reference is now made to the following description, taken in conjunction with the accompanying drawings, which depict various embodiments of the disclosure.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments and furthermore than the component features of the disclosed embodiments may be combined with one another unless clearly mutually exclusive, even though every such combination is not expressly described.

As will be described in further detail, the inventors of the present disclosure have developed methods and systems for virtual management of disaggregated network systems. The methods and systems allow a user to easily plug and play new blades in a disaggregated network system. The methods and systems also allow a user to properly detect when a blade has been improperly connected or "mis-cabled."

Figure 1:
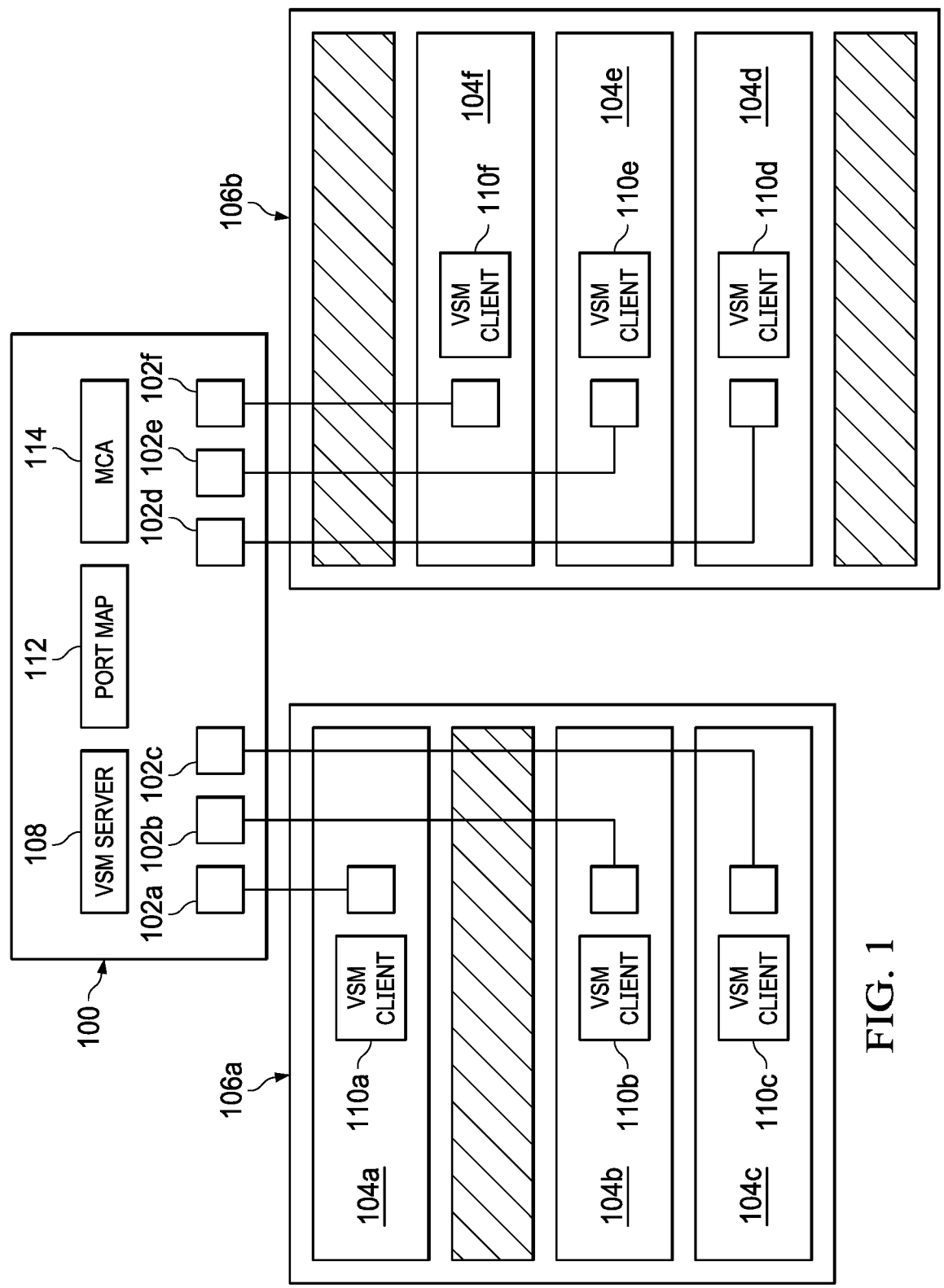
FIG. 1 is a schematic diagram of a disaggregated network system.

FIG. 1 depicts an exemplary disaggregated network system. One advantage of the system of FIG. 1 is that it allows for disaggregated scalability by providing a system that is not confined to a predetermined chassis size. A user can add or remove tributary blades as needed by communicatively coupling or decoupling a tributary blade to a port of an MCU. A further advantage of the system shown in FIG. 1 is that the user can easily add a new blade when needed. This function may be referred to as "plug-and-play" functionality. In some disaggregated network systems, a user has to effectively deploy a new NE to add a new tributary blade. The system shown in FIG. 1 allows users to avoid unnecessary setups with adding new blades, allowing for plug-and-play functionality. A further advantage of the system is that blades can be assigned new tasks or replaced without manual intervention.

The system as shown is an NE. The system may be a portion of an NE or include multiple NEs. The NE includes a management control unit blade (an MCU) 100. The MCU 100 includes ports 102a, 102b, 102c, 102d, 102e, and 102f. The port 102a is communicatively coupled to tributary blade 104a of a rack 106a. The ports 102b and 102c are respectively communicatively coupled to tributary blades 104b and 104c of the rack 106a. The ports 102d, 102e, and 102f are respectively communicatively coupled to tributary blades 104d, 104e, and 104f. The tributary blades 104a through 104f may therefore communicate with the MCU 100 sending and receiving information through, for example, optical fiber, Ethernet, and twisted pairs. The MCU 100 can monitor the telecommunication traffic in and out of each tributary blade 104a through 104d and send instructions to the tributary blades 104a through 104d.

With the system of FIG. 1, a user can plug and play and avoid mis-cabling. A virtual shelf management (VSM) server 108 assigns a port ID to the port 102a. For example, the MCU 100 can assign the port 102a a port ID of "1." The port ID may also be pre-registered through hardware configuration or stored in memory for software to access. A port ID may be any value that can be represented in binary and serves to distinguish a port on the MCU from other ports. A port ID may be a location in memory instead of or in addition to a value. Each port has assigned a port ID. A port ID is assigned by being stored in any memory of the system, including, for example, a local memory of a tributary blade, a local memory of an MCU, or a persistent system memory. The VSM server 108 is an application run by the MCU 100 operable to receive inputs from the tributary blades 104a through 104f and send outputs to the tributary blades 104a through 104f. The tributary blades 104a through 104f are coupled to the MCU 100 in a star configuration, meaning that each of the tributary blades 104a through 104f are coupled directly to the MCU 100 and indirectly to each other.

To track which tributary blade should be received by which port, the system includes a port map 112. The port map 112 can be stored, for example, in a local memory on the MCU 100 or in a persistent system memory. The persistent system memory may be in a location not internal to the MCU 100 and may be accessible by multiple MCUs. A persistent system memory is a memory operable to store information from more than one blade, more than one NE, or both. A port map could be stored in a memory of a tributary blade. The port map 112 includes electronically-represented values and contains information on which port IDs correspond to which virtual slot IDs. A port map may also contain information regarding the tasks assigned to the ports or virtual slot IDs. The tasks may be represented by values in the port IDs or the virtual slot IDs themselves. As an example of how a port map functions, assume the port 102a is assigned port ID "1." If virtual slot ID "A" is mapped to port ID "1," the port map 112 contains the information that "A" is mapped to "1."

The exemplary system commissions the tributary blade 104a as follows. A VSM server 108 running on the MCU 100 manages the port map 112 and is operable to process registration requests from the tributary blades 104a through 104f, and assign virtual slot IDs and tasks to the tributary blades 104a through 104f. Additionally or alternatively, the user manages the port map 112. A VSM client 110a running on the tributary blade 104a is operable to communicate with the VSM server 108. The VSM client 110a is an application for interfacing with the VSM server 108 (to send outputs to and receive inputs from the VSM server 108). The VSM client 110a sends a registration request through the port 102a to be processed by the VSM server 108. The registration request may contain information including, for example, an IP address, information about the model of the tributary blade and type or task of the tributary blade 104a, a virtual slot ID of the tributary blade 104a, the MCU to which the tributary blade 104a is connected, and a port ID mapped to the virtual slot ID of the tributary blade 104a. If the VSM server 108 determines that the tributary blade 104a has not been pre-registered or has not already been assigned a virtual slot ID, the VSM server 108 will approve the registration request and send a signal through the port 102a to the tributary blade 104a, assigning a virtual slot ID to the tributary blade 104a. Since the port 102a has a port ID of "1," the VSM server 108 assigns to the tributary blade 104a the virtual slot ID that has been mapped to "1." In this case, the virtual slot ID is "A." In assigning the tributary blade 104a the virtual slot ID "A," the VSM server 108 may instruct the tributary blade 104a, MCU, or other device to store the virtual slot ID in memory. In assigning the tributary blade 104a the virtual slot ID "A," the virtual slot ID may be stored in memory, such as a local memory of the tributary blade. The virtual slot ID may be stored, for example, in persistent system memory, a local memory of the MCU, or a local memory of the tributary blade. When the tributary blade 104a is disconnected and reconnected, the MCU 100 can identify the tributary blade 104a by reading its assigned virtual slot ID "A." Virtual slot ID "A" may serve simply to identify a tributary blade, certain hardware or software therein, or may correspond to certain tasks. For example, the VSM server 108 may assign certain tasks to a tributary blade by assigning to the tributary blade virtual slot ID "A."

A virtual slot ID may be any value that can be represented in binary and serves to distinguish a tributary blade from other tributary blades. A virtual slot ID may be a location in memory instead of or in addition to a value.

A tributary blade may be pre-registered and may have previously been assigned a virtual slot ID before the tributary blade is received by a port. Upon receiving the tributary blade 104b at the port 102b, the VSM server 108 will determine if the tributary blade 104b has been assigned a virtual slot ID by reading, for example, a local memory of the tributary blade 104b. The virtual slot ID or other information regarding whether the tributary blade 104b is pre-registered may be contained in a registration request sent by the tributary blade 104b. As an example, assume the local memory of the tributary blade contains the virtual slot ID "B" or a pointer that points to "B." Assume port 102b has been assigned a port ID of "2." Since the tributary blade 104b has been received at the port 102b, the MCU will look in the port map to see if "B" has been mapped to the port ID ("2") of port 102b. If "B" has been mapped to "2" in the port map, then the VSM server 108 will approve and accept the registration request. If there is a mismatch, for example, if "B" was mapped to "4" or any other port ID to which the virtual slot ID of "B" is not mapped, the VSM server 108 will deny the registration request. Denial in this case is desired because the tributary blade 104b has previously received a virtual slot ID assignment corresponding to a port with a different port ID. The VSM server 108 now denies the request because the tributary blade 104b is now being received at the wrong port. A mis-cabling condition exists.

If a mis-cabling condition exists, the VSM server may send an alert to the user. The alert may be any light or graphical indicator, such as a text, on the MCU 108, the tributary blade 102b, the NE, or any device used to monitor the NE or disaggregated network system, such as a second NE, personal computer, terminal, mobile device, etc.

To decrease the chance a mis-cabling condition is erroneously detected, the tributary blade 102b may attempt to re-register. If a mis-cabling condition exists, the VSM server 108 will generally deny the registration request from the tributary blade 102b. If a registration request is denied, the VSM server will add to a request count, tracking the number of requests made by the tributary blade 102b. The tributary blade 102b will iteratively send additional requests, while the VSM server 108 adds to the request count. The tributary blade 102b will stop sending requests when the VSM server 108 approves the tributary blade 102b for registration or when the request count meets a set number. The set number may be any number and may be pre-set in the system or set by a user.

The detection of a mis-cabling condition and prevention of a tributary blade from registering when such a condition occurs may often be desired. But a user may desire to change a port of an existing and pre-registered tributary blade. Therefore, in some circumstances, the system allows for overriding or preventing the denial of registration that occurs in a detected mis-cabling condition. The system allows for a user to change the port and virtual slot ID of a pre-registered blade as follows. An erasure instruction is sent to and received by the VSM server 108 and MCU 100. The erasure instruction may be sent from the tributary blade 102b and received by the VSM server 108. The erasure instruction may be sent from elsewhere in the system, such as from a device higher in the network system architecture hierarchy than the MCU 100 or another NE. The erasure instruction may be input to the MCU 100 by a user in any number of ways. The erasure instruction is received by the VSM server 100. The VSM server 100 then sends an instruction to the tributary blade 102b to erase its pre-registered virtual slot ID. After instructing the tributary blade 102b to erase its virtual slot ID, the VSM server 108 may instruct the tributary blade 102b to restart and the tributary blade 102b will restart. Once the tributary blade 102b no longer has a virtual slot ID stored in its local memory, the VSM server 108 will accept an additional registration request from the tributary blade 102b. An additional registration request may have default values (provisioned by the user, VSM server, or a combination thereof). The VSM server 108 (automatically or through the user) will then assign a virtual slot ID to the tributary blade 102b and map the virtual slot ID to the port ID in the port map 112.

The user may also commission a new tributary blade without touching any element. For example, the VSM server 108 can erase any tributary blade's default parameters and send a new set of default parameters. The VSM server 108 can assign tasks to virtual slot IDs and thereafter change the task of a tributary blade by assigning a new virtual slot ID or changing the task of a pre-assigned virtual slot ID.

The system of FIG. 1 achieves plug-and-play functionality because it allows for automatic registration and communication with new tributary blades. When a tributary blade is plugged in, it can immediately send a registration request. When registration is approved, the VSM server 108 can then assign a virtual slot ID to the tributary blade 104a. Once the tributary blade 104a is assigned a virtual slot ID, a management and control application (MCA) 114 running on the MCU 108 can begin communications with the tributary blade 104a based on its virtual slot ID. That is, a user does not have to manually provision the tributary blade 104a and does not have to deploy an entire NE. Once the tributary blade 104a receives its virtual slot ID, the MCA 114 running on the MCU 108 can receive inputs from the from the tributary blade 104a and send outputs to the tributary blade 104a. The MCA 114 can send the tributary blade 104a a default set of parameters. For example, the MCA 114 can provision the tributary blade 104a with a default set of parameters for the tributary blade 104a to perform a certain role, use certain hardware, or execute certain software to perform desired tasks such as transporting telecommunications. The MCA 114 is therefore operable to control the operation of the tributary blade 104a upon plug-in without lengthy setup, manual setup, or deployment of an entire NE. Since the system can detect a mis-cabling condition, the system also avoids errors that could otherwise occur with plug-and-play functionality. The above discussion could apply to any port 102b through 102f and tributary blades 104a through 104d.

The VSM server and MCA 114 are shown separately in FIG. 1. But a VSM can be part of an MCA. An MCA can be part of the VSM. Additionally, a port map can contain the virtual slot ID and port ID information for part of an NE, an entire NE, or numerous NEs. The shown NE may have more or less tributary blades. The disaggregated network system can be a single NE, multiple NEs, or a portion of an NE or multiple NEs. The system may have numerous additional NEs, each with the same or more or less tributary blades. Any tributary blade made be communicatively coupled to a port with additional cables.

To allow for the benefits of a disaggregated network system, while providing capabilities similar to the plug-and-play of an aggregated network, the inventors have developed methods for virtual management of disaggregated network systems.

Figure 2:
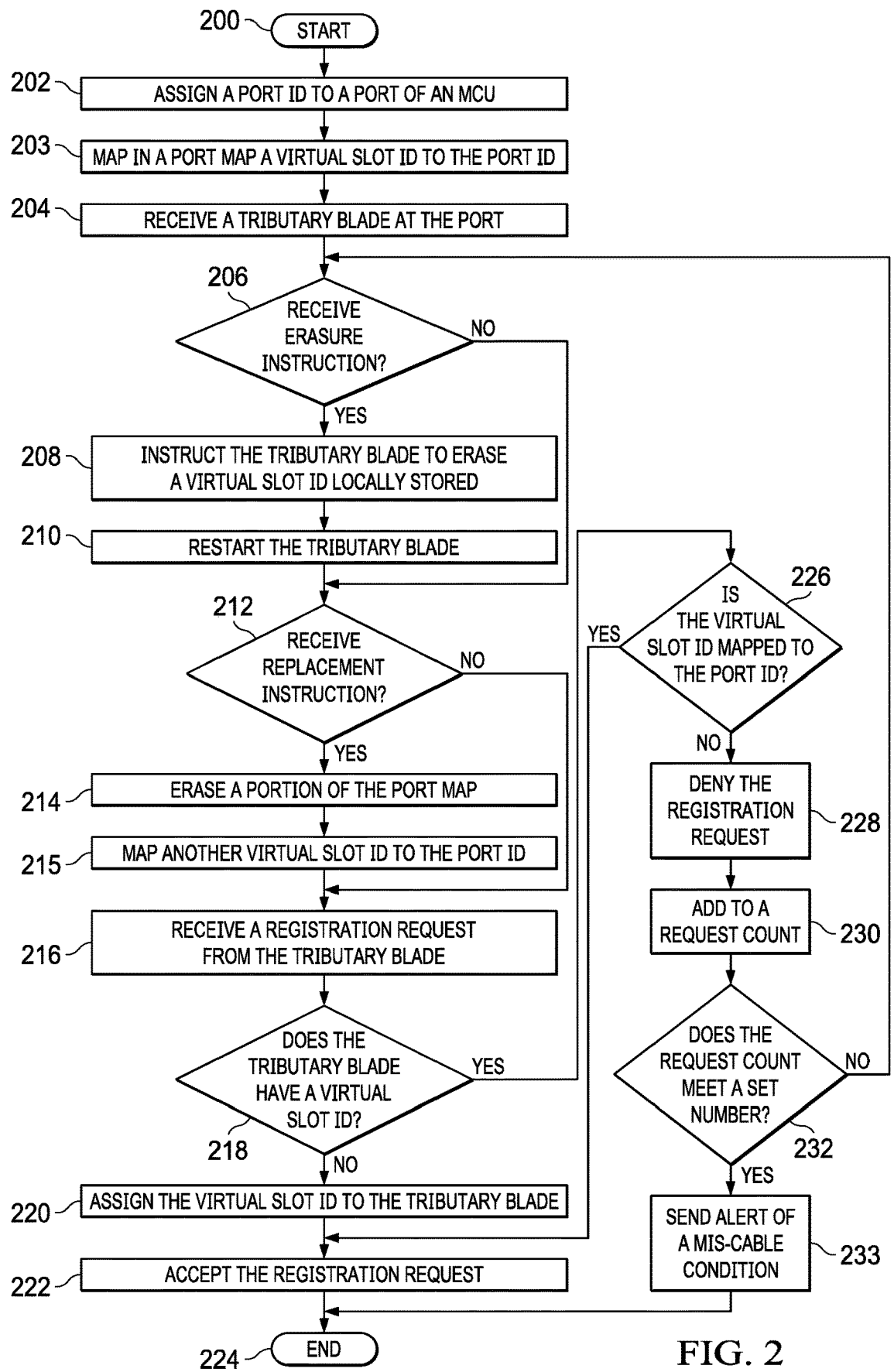
FIG. 2 is a flow chart of a method of commissioning a blade in a disaggregated network system.

FIG. 2 depicts a flow chart of an exemplary method of commissioning a blade in a disaggregated network system. Note that the method may be used in accordance with any of the systems disclosed herein. One advantage of the method of FIG. 2 is that it allows for disaggregated scalability by providing a system that is not confined to a predetermined chassis size. A user can add or remove tributary blades as needed by communicatively coupling or decoupling a tributary blade to a port of an MCU. A further advantage of the method shown in FIG. 2 is that the user can easily add a new blade when needed. This function may be referred to as "plug-and-play" functionality. In some commissioning methods, a user has to effectively deploy a new NE to add a new tributary blade. The method shown in FIG. 2 allows users to avoid unnecessary setups with adding new blades, allowing for plug-and-play functionality.

In the method shown in FIG. 2, the method includes starting at step 200. The method includes assigning a port ID to a port of an MCU at step 202. A virtual shelf management (VSM) server may assign the port ID. The assigning the port ID may include storing the port ID in a system or local memory. The assigning the port ID may include storing the port ID in a port map. The port ID may be assigned by a manufacturer through hardware configuration or stored in memory for software to access. The port ID may be any value that can be represented in binary and serves to distinguish a port on the MCU from other ports. The port ID may be a location in memory instead of or in addition to a value.

At step 203, the method includes mapping to the port map a virtual slot ID to the port ID. The mapping may be done with the VSM server automatically, by a user, or a combination thereof. Step 203 may include storing the virtual slot ID in an MCU memory, a tributary blade memory, or a persistent system memory. The port map may contain a portion or all of the port IDs and virtual slot IDs for the tributary blades and ports of the NE, or a portion of or all of the port IDs and virtual slot IDs of the tributary blades and ports of multiple NEs. The mapping enables the tributary blade to communicate with an MCA such that no manual provisioning of tributary blades is necessary in the method. The mapping also allows for detecting of mis-cabling.

The method includes receiving a tributary blade the port at step 204. Step 204 may include receiving the tributary blade with the MCU by the MCU being communicatively coupled to the tributary blade. The method includes determining whether an erasure instruction was received at step 206. An erasure instruction, initiated by a user or automatically, allows a disaggregated network system to allow registration of a tributary blade that had a pre-existing virtual slot ID. Otherwise, the system may deny registration of the tributary blade. The erasure instruction may be received by the tributary blade or the MCU. If an erasure instruction is received, the method includes instructing the tributary blade to erase a virtual slot ID stored in at least a portion of a local memory of the tributary blade at step 208. The MCU may instruct the tributary blade to erase a virtual slot ID in a local memory of the tributary blade. Alternatively or additionally, the method may include instructing the MCU to erase a virtual slot ID in persistent system memory or in a local memory in the MCU.

The method includes restarting the tributary blade at step 210. The restarting the tributary blade allows the tributary blade to refresh before sending a registration request to be received (at a later step) by the MCU and VSM server so the tributary blade does not again send the same registration request with, for example, the same virtual slot ID as before. The restarting the tributary blade may include instructing, with the VSM server, the tributary blade to restart.

If no erasure instruction is received at step 206, or after restarting the tributary blade at step 210, the method includes determining whether a replacement instruction was received at step 212. A replacement instruction may be received if a user wants to add a tributary blade to a port, keeping a virtual slot ID of the tributary blade and changing the virtual slot ID mapped to the port ID. The user wants to use the same port, but with a different blade or a same blade with a different virtual ID than before. If a replacement instruction was received, the method includes erasing a portion of a port map at step 214. The replacement instruction may be received by the MCU or the tributary blade. The portion of the port map may be stored in persistent system memory, a local memory of the tributary blade, or a local memory of the MCU. Erasing a portion of the port map at step 214 includes erasing the portion of the port map that includes the virtual slot ID stored in the port map as corresponding to the port ID and the port to which the tributary blade is coupled. At step 215, the method includes mapping another virtual slot ID to the port map. The mapping another virtual slot ID to the port map may include mapping another virtual slot ID to the port ID. Accordingly, the method allows for changing the virtual slot ID mapped to a port ID (and therefore, for example, the tributary blade used at the port).

If no replacement instruction is received at step 212, the method includes next receiving a registration request from the tributary blade at step 216. A VSM client running on the tributary blade is operable to send outputs to and receive inputs from the VSM server. The tributary blade, from the VSM client, sends a registration request through the port to the VSM server. The VSM server receives the registration request. The registration request may contain information including, for example, an IP address, information about the model of the tributary blade and task of the tributary blade, and a virtual slot ID of the tributary blade, the MCU to which the tributary blade is connected, and a port ID mapped to the virtual slot ID.

Step 218 is part of the method that is used to determine whether the MCU and VSM server should approve the registration request or whether a mis-cabling condition exists. At step 218, the method includes determining whether the tributary blade is pre-registered or has an existing virtual slot ID. The method at step 218 may include reading local memory from the tributary blade, receiving the registration request from the tributary blade, reading persistent system memory, reading local MCU memory, reading the port map, or a combination thereof.

In telecommunications systems, there may be numerous cables that are difficult to keep track of. For example, the number of cables that communicatively couple tributary blades to MCUs can constitute thousands of cables. When a user wishes to add a new tributary blade, it may be difficult to track a new cable or ensure the tributary blade is connected to a desired port. Since the method of FIG. 2 allows for automated assignment of a virtual slot ID when a new tributary blade is connected to a port, it is useful to detect when a mis-cabling exists so as to not send instructions to a blade that were intended for another blade. Sending instructions to the wrong blade can prevent telecommunications from being sent to the desired and proper destination.

If the tributary blade does not have a virtual slot ID at step 218, the method includes, at step 220, assigning the virtual slot ID to the tributary blade. The assigning the virtual slot ID at step 220 may include instructing the tributary blade to store the virtual slot ID in memory, such as the local memory of the tributary blade. The assigning the virtual slot ID at step 220 may include storing the virtual slot ID in memory including, for example, a local memory of the tributary blade, a local memory of the MCU, or a persistent system memory. Step 220 includes sending with the VSM server of the MCU a signal through the port receiving the tributary blade. Step 220 includes generating the virtual slot ID with the tributary blade, MCU, or other system component.

The method then includes accepting the registration request at step 222. The accepting the registration request may be done by the VSM server of the MCU. The accepting the registration request at step 222 includes allowing an MCA of the MCU to communicate operational instructions with the tributary blade or otherwise allowing the tributary blade to begin normal operation. After accepting the registration request, the method includes ending at step 224.

If the tributary blade does have a virtual slot ID at step 218, the method includes determining whether the virtual slot ID of the tributary blade is mapped to the port ID at step 226. If true, the tributary blade has already been assigned to the port. Accordingly, the method includes accepting the registration request at step 222.

If the virtual slot ID of the tributary blade is not mapped to the port ID in the port map at step 226, then the method has determined, at least initially, that a mis-cabling condition exists, and the method includes denying a registration request at step 228. The VSM server of the MCU may deny the registration request and prevent communication between the MCA and the tributary blade or otherwise prevent normal operation of the tributary blade. To ensure an error did not occur, the method includes retrying registration. Specifically, the method includes adding to a request count at step 230. Each time the tributary blade is denied its registration request the count will increase. The request count may therefore be iteratively added for every time the tributary blade is denied registration. At step 232, if the request does not meet a set number, the method continues at step 206. The method may continue at other steps. The method then again allows sending a registration request at step 222. The registration request can have the same or different binary values as an earlier registration request.

To prevent the method from entering an infinite loop of registering attempts, if the request count does meet a set number at step 232, the method includes sending an alert of a mis-cabling condition. The alert may be any light or graphical indicator, such as a text, on the tributary blade, the NE, or any device used to monitor the NE or disaggregated network system, such as a second NE, personal computer, terminal, mobile device, etc. The method then ends at step 224.

Figure 3:
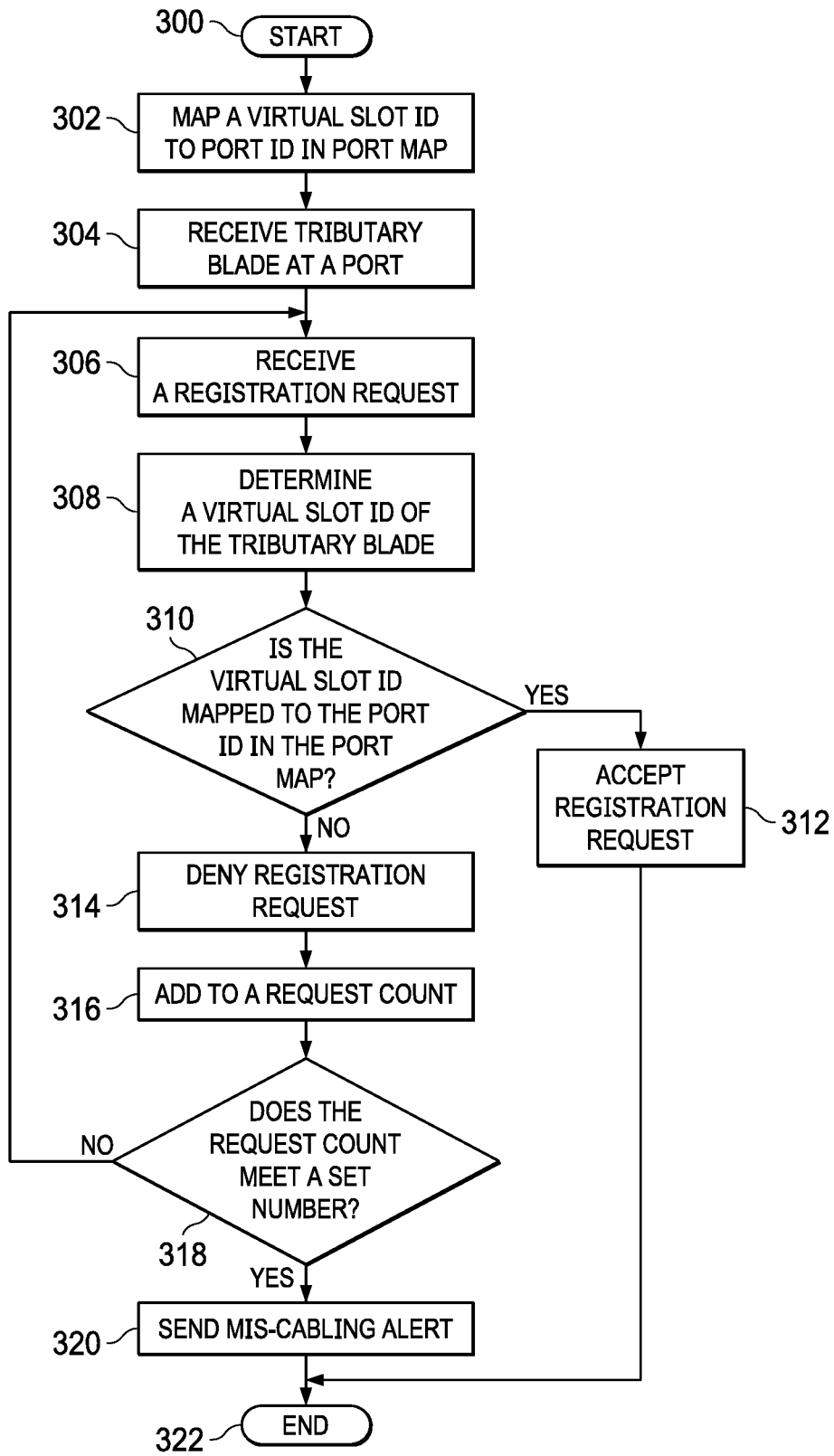
FIG. 3 is a flow chart of a method of determining whether a mis-cabling condition exists in a disaggregated network system.

FIG. 3 is a flow chart of an exemplary method of determining whether a mis-cabling condition exists in a disaggregated network system. The method can be used with other methods and systems disclosed herein. After starting the method at step 300, the method includes mapping a virtual slot ID to a port ID in a port map at step 302. The port ID serves to identify a port of an MCU. Step 300 may include storing the virtual slot ID in an MCU memory, a tributary blade memory, or a persistent system memory. The port map may contain a portion of or all of the port IDs and virtual slot IDs of tributary blades and ports of an NE, or a portion of or all of the port IDs and virtual slot IDs of the tributary blades and ports of multiple NEs. The mapping allows tributary blades to communicate with an MCA such that no manual provisioning of tributary blades is necessary in the method. The mapping also allows for detecting of mis-cabling.

The method includes receiving a tributary blade at the port at step 304. Step 304 may include receiving the tributary blade with the MCU by way of the MCU being communicatively coupled to the tributary blade. The method includes receiving a registration request from the tributary blade at a port of the MCU at step 306.

The method includes determining a virtual slot ID of the tributary blade at step 308. In other words, step 308 includes determining a value assigned to the tributary blade and whether no value has been assigned to the tributary blade. The determining the virtual slot ID of the tributary blade may include reading the virtual slot ID from an MCU memory, a tributary blade memory, or a persistent system memory. Step 308 includes determining if the tributary blade has a pre-registered virtual slot ID, and, if not, assigning the tributary blade the virtual slot ID mapped to the port ID of the port by which the MCU receives the tributary blade. If the tributary blade does have a pre-registered virtual slot ID, the method proceeds to step 310.

Step 310 includes determining whether the virtual slot ID of the tributary blade is mapped to the port ID in the port map. Step 310 includes reading from the local memory of the tributary blade to determine the virtual slot ID assigned to the tributary blade. Step 310 includes reading from the port map to determine whether the port ID has been mapped to any value and if that value matches the virtual slot ID. The value mapped to the port ID may match the virtual slot ID by containing all of the virtual slot ID, a portion of the virtual slot ID, a reference or pointer to the virtual slot ID, or a combination thereof. If the value mapped to the port ID matches the virtual slot ID (that is, if the virtual slot ID is mapped to the port ID in the port map) the system determines that a mis-cabling condition does not exists and accepts the registration request from the tributary blade at step 312. An MCA of the MCU can then communicate operational instructions with the tributary blade or otherwise allowing the tributary blade to begin normal operation and execute its assigned task.

If, at step 310, it is determined that the virtual slot ID is not mapped to the port map, the method includes denying the registration request at step 314 to prevent the tributary blade from entering normal operation. Normal operation refers to, for example, receiving tasks from an MCA and performing those tasks. The registration request is denied when it is determined that the virtual slot ID is not mapped to the port map because a mis-cabling condition is likely to exist. A mis-cabling condition is likely to exist because the method has determined that the virtual slot ID of the tributary blade does not match the value that would be sent to the tributary blade had the tributary blade been received by the MCU at the port.

To ensure an error did not occur, the method includes retrying registration. Specifically, the method includes adding to a request count at step 316. Each time the tributary blade is denied its registration at step 312, the request count will increase at step 316. If the request count does not meet a set number at step 318, the method continues at step 306 and tries again to register the tributary blade. The request count may therefore be iteratively added to for every time the tributary blade is denied registration.

To prevent the method from entering an infinite loop, at step 318, the method includes determining whether the request count meets a set number. If the request does not meet a set number at step 318, the method continues at step 306 and again receives a registration request. The registration request can have the same or different binary values as an earlier registration request.

If at step 318, the request count does meet a set number, the method depicted by FIG. 3 has determined that a mis-cabling condition exists and includes sending an alert of a mis-cabling condition at step 320. The alert may be any light or graphical indicator, such as a text, on the tributary blade, the NE, or any device used to monitor the NE or disaggregated network system, such as a second NE, personal computer, terminal, mobile device, etc. The method then ends at step 322.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents and shall not be restricted or limited by the foregoing detailed description.

The invention claimed is:

1. A method of commissioning a tributary blade in a disaggregated network system, the method comprising:
   assigning a port identifier (port ID) to a port of a management and control unit (MCU);
   mapping to a port map, with a virtual shelf management (VSM) server running on the MCU, a virtual slot identifier (virtual slot ID) to the port ID;
   receiving with the VSM server, through the port, a registration request from a tributary blade;
   determining whether the tributary blade is pre-registered;
   when the tributary blade is not pre-registered, assigning the virtual slot ID to the tributary blade and accepting the registration request;
   when the tributary blade is pre-registered and when the tributary blade is pre-registered with the virtual slot ID, accepting the registration request; and
   when the tributary blade is pre-registered, and when the tributary blade is not pre-registered with the virtual slot ID, iteratively adding to a request count and receiving, from the tributary blade with the VSM server, an additional registration request until the VSM server accepts the additional registration request or the request count meets a set number.

2. The method of claim 1, further comprising:
   determining a first value, the first value mapped to the port ID in the port map;
   determining a second value, the second value assigned to the tributary blade;
   determining whether the first value matches the second value; and
   when the first value does not match the second value, determining that a mis-cabling condition exists.

3. The method of claim 2, further comprising sending an alert of the mis-cabling condition when the first value does not match the second value.

4. The method of claim 1, wherein the assigning the virtual slot ID to the tributary blade comprises instructing the tributary blade to store the virtual slot ID in a local memory of the tributary blade.

5. The method of claim 1, further comprising instructing, with the VSM server, the tributary blade to erase at least a portion of a local memory of the tributary blade, wherein at least the portion of the local memory of the tributary blade stores the virtual slot ID.

6. The method of claim 5, further comprising receiving, with the VSM server, an erasure instruction to erase at least the portion of the local memory of the tributary blade.

7. The method of claim 6, further comprising:
   instructing, with the VSM server, the tributary blade to restart after instructing, with the VSM server, the tributary blade to erase at least the portion of the local memory of the tributary blade; and
   receiving with the VSM server, from the tributary blade, a second registration request.

8. The method of claim 1, further comprising storing the virtual slot ID in a local memory of the tributary blade.

9. The method of claim 1, further comprising storing the port map in a persistent system memory.

10. The method of claim 9, further comprising:
    receiving, with the VSM server, a replacement instruction; and
    erasing a portion of the port map that has mapped the virtual slot ID to the port ID.

11. The method of claim 10, further comprising mapping to the port map a second virtual slot identifier (second virtual slot ID) to the port ID.

12. A disaggregated network system comprising:
    a management and control unit (MCU) comprising:
      a virtual shelf management (VSM) server running on the MCU;
      a first port assigned a first port identifier (first port ID); and
      a second port assigned a second port identifier (second port ID); and
    a first tributary blade releasably and communicatively coupled to the MCU at the first port;
    the MCU is operable to:
      receive with the VSM server, through the first port, a registration request from the first tributary blade;
      determine whether the first tributary blade is pre-registered;
      when the first tributary blade is not pre-registered, assign a first virtual slot identifier (first virtual slot ID) to the first tributary blade and accept the registration request;
      when the first tributary blade is pre-registered and when the first tributary blade is pre-registered with the first virtual slot ID, accept the registration request;
      when the first tributary blade is pre-registered, and when the first tributary blade is not pre-registered with the first virtual slot ID, iteratively adding to a request count and receiving, from the first tributary blade, an additional registration request until the VSM server accepts the additional registration request or the request count meets a set number; and
      map the first virtual slot ID to the first port ID in a port map.

13. The disaggregated network system of claim 12, wherein the MCU further comprises a second tributary blade releasably and communicatively coupled to the MCU at the second port, and the first tributary blade and second tributary blade are communicatively and releasably coupled to the MCU in a star configuration.

14. The disaggregated network system of claim 13, wherein:
    the first tributary blade runs a first VSM client operable to communicate with the VSM server; and
    the second tributary blade runs a second VSM client operable to communicate with the VSM server.

15. The disaggregated network system of claim 13, wherein:
    the first tributary blade comprises a first local memory storing the first virtual slot ID; and
    the second tributary blade comprises a second local memory storing the second virtual slot ID.

16. The disaggregated network system of claim 13, further comprising a management and control application (MCA) running on the MCU, wherein the MCA is operable to communicate with the first tributary blade based on the first virtual slot ID and the second tributary blade based on the second virtual slot ID.

17. The disaggregated network system of claim 12, further comprising a persistent system memory storing the port map.

* * * * *